US007792944B2

(12) United States Patent
DeSantis et al.

(10) Patent No.: US 7,792,944 B2
(45) Date of Patent: Sep. 7, 2010

(54) EXECUTING PROGRAMS BASED ON USER-SPECIFIED CONSTRAINTS

(75) Inventors: Peter N. DeSantis, Cape Town (ZA); Quinton R. Hoole, Cape Town (ZA); Roland Paterson-Jones, Cape Town (ZA); Allan H. Vermeulen, Seattle, WA (US); Luis Felipe Cabrera, Bellevue, WA (US); Marvin M. Theimer, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 406 days.

(21) Appl. No.: 11/851,345

(22) Filed: Sep. 6, 2007

(65) Prior Publication Data

US 2008/0059557 A1   Mar. 6, 2008

Related U.S. Application Data

(63) Continuation-in-part of application No. 11/395,463, filed on Mar. 31, 2006.

(51) Int. Cl.
*G06F 15/173* (2006.01)

(52) U.S. Cl. .................. 709/223; 709/224; 709/229

(58) Field of Classification Search .............. 709/223, 709/224, 203, 217, 219, 229
See application file for complete search history.

(56) References Cited

U.S. PATENT DOCUMENTS

| 6,411,967 | B1 | 6/2002 | Van Renesse | 707/201 |
|---|---|---|---|---|
| 6,430,607 | B1 | 8/2002 | Kavner | |
| 6,529,953 | B1 | 3/2003 | Van Renesse | 709/223 |
| 6,724,770 | B1 | 4/2004 | Van Renesse | 370/432 |
| 6,782,398 | B1 | 8/2004 | Bahl | |
| 6,810,291 | B2 * | 10/2004 | Card et al. | 700/48 |
| 7,139,821 | B1 * | 11/2006 | Shah et al. | 709/224 |
| 7,430,610 | B2 * | 9/2008 | Pace et al. | 709/233 |
| 2001/0000811 | A1 | 5/2001 | May et al. | |
| 2002/0002613 | A1 * | 1/2002 | Freeman et al. | 709/225 |
| 2002/0082858 | A1 | 6/2002 | Heddaya et al. | |

(Continued)

OTHER PUBLICATIONS

"Global Server Load Balancing with ServerIron," Foundry Networks, retrieved Aug. 30, 2007, from http://www.foundrynet.com/pdf/an-global-server-load-bal.pdf, 7 pages.

(Continued)

*Primary Examiner*—Lashonda T Jacobs
(74) *Attorney, Agent, or Firm*—Seed IP Law Group

(57) ABSTRACT

Techniques are described for managing execution of programs on multiple computing systems, such as based at least in part of user-specified constraints. For example, constraints related to execution of a program may be based on a desired relative location of a host computing system to execute a copy of the program with respect to an indicated target (e.g., computing systems executing other copies of the program or copies of another indicated program), on particular geographic locations, and/or on factors not based on location (e.g., cost of use of a particular computing system, capabilities available from a particular computing system, etc.). Some or all of the multiple computing systems may be part of a program execution service for executing multiple programs on behalf of multiple users, and each may provide multiple virtual machines that are each capable of executing one or more programs for one or more users.

29 Claims, 5 Drawing Sheets

U.S. PATENT DOCUMENTS

| | | | |
|---|---|---|---|
| 2004/0059805 | A1 | 3/2004 | Dinker et al. |
| 2005/0168782 | A1* | 8/2005 | Kobashi et al. ............ 358/1.18 |
| 2005/0283759 | A1 | 12/2005 | Peteanu et al. |
| 2005/0283784 | A1 | 12/2005 | Suzuki |
| 2006/0047813 | A1 | 3/2006 | Aggarwal et al. |
| 2006/0184936 | A1 | 8/2006 | Abels et al. |

OTHER PUBLICATIONS

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved May 3, 2006, from http://www.eweek.com/article2/0,1772626,00.asp, 5 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen Virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

Clark, C., "Live Migration of Virtual Machines," May 2005, NSDI '05: 2$^{nd}$ Symposium on Networked Systems Design and Implementation, Boston, MA May 2-4, 2005, retrieved from http://www.usenix.org/events/nsdi05/tech/full_papers/clark/clark.pdf, 14 pages.

Demers, A., "Epidemic Algorithms For Replicated Database Maintenance," 1987, Proceedings of the Sixth Annual ACM Symposium on Principles of Distributed Computing, Vancouver, British Columbia, Canada, Aug. 10-12, 1987, 12 pages.

Gruener, J., "A Vision of Togetherness," May 24, 2004, Network World, retrieved May 3, 2006, from, http://www.networkworld.com/supp/2004/ndc3/0524virt.html, 9 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Shankland, S., "Sun to Buy Start-Up to Bolster N1," Jul. 30, 2003, CNet News.com, retrieved May 3, 2006, http://news.zdnet.com/2100-3513_22-5057752.html, 8 pages.

Van Renesse, R., "Astrolabe: A Robust and Scalable Technology for Distributed System Monitoring, Management, and Data Mining," May 2003, *ACM Transactions On Computer Systems (TOCS)*, 21(2):164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtual Iron®, retrieved May 3, 2006, from http://www.virtualiron.com/, 1 page.

Waldspurger, C.A., "Spawn: A Distributed Computational Economy," Feb. 1992, *IEEE Transactions on Software Engineering*, 18(2):103-117, 15 pages.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

"Scalable Trust of Next Generation Management (STRONGMAN)," retrieved May 17, 2006, from http://www.cis.upenn.edu/~dsl/STRONGMAN/, 4 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Coulson, D., "Network Security Iptables," Apr. 2003, Linuxpro, Part 2, retrieved from http://davidcoulson.net/writing/lxf/39/iptables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

\* cited by examiner

EXECUTING PROGRAMS BASED ON USER-SPECIFIED CONSTRAINTS

CROSS REFERENCE TO RELATED APPLICATIONS

This application is a continuation-in-part of U.S. application Ser. No. 11/395,463, filed Mar. 31, 2006 and entitled "Managing Execution of Programs by Multiple Computing Systems," which is hereby incorporated by reference in its entirety.

TECHNICAL FIELD

The following disclosure relates generally to managing execution of programs on multiple computing systems based at least in part on user-specified constraints.

BACKGROUND

Data centers housing significant numbers of interconnected computing systems have become commonplace, such as private data centers that are operated by and on behalf of a single organization, and public data centers that are operated by entities as businesses to provide computing resources to customers. For example, some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

While the availability of data centers and virtualization technologies has provided various benefits, various problems still exist. For example, one problem that arises in the context of data centers that host large numbers of programs for a set of diverse customers on large numbers of physical computing systems involves managing the execution of programs for customers in such a manner as to meet customer expectations while also making efficient use of the computing systems. For example, a first customer may desire that at least some of his/her programs be executed in widely distributed locations, so that a failure of a single physical computing system or of connectivity to a particular data center does not cause access to all of those programs to be lost. Conversely, a second customer may desire that at least some of his/her programs be executed close to each other so that network connectivity between the programs is likely to have desired performance characteristics (e.g., low latency, high throughput, etc.). In addition, particular customers may desire particular capabilities for computing systems that execute particular programs, with some capabilities being available from only a subset of the computing systems. However, it is difficult for customers to specify such expectations—for example, a customer may need to obtain information about all of the possibly available computing systems (e.g., their locations and capabilities), and repeatedly execute programs by identifying a particular computing system whose capabilities and location is appropriate for execution of a particular program and by manually requesting that the particular computing system be used to execute the program, which is highly time-consuming and inefficient. In addition, it is difficult for an operator of one or more data centers to efficiently satisfy such customer expectations—for example, if a customer requests that a particular computing system be used to execute a particular program, the operator may be unable to satisfy the request (e.g., that computing system may be currently unavailable, or would be overloaded if used as requested), while other available computing systems that would also be appropriate may be under-utilized.

DETAILED DESCRIPTION

Figure 1:
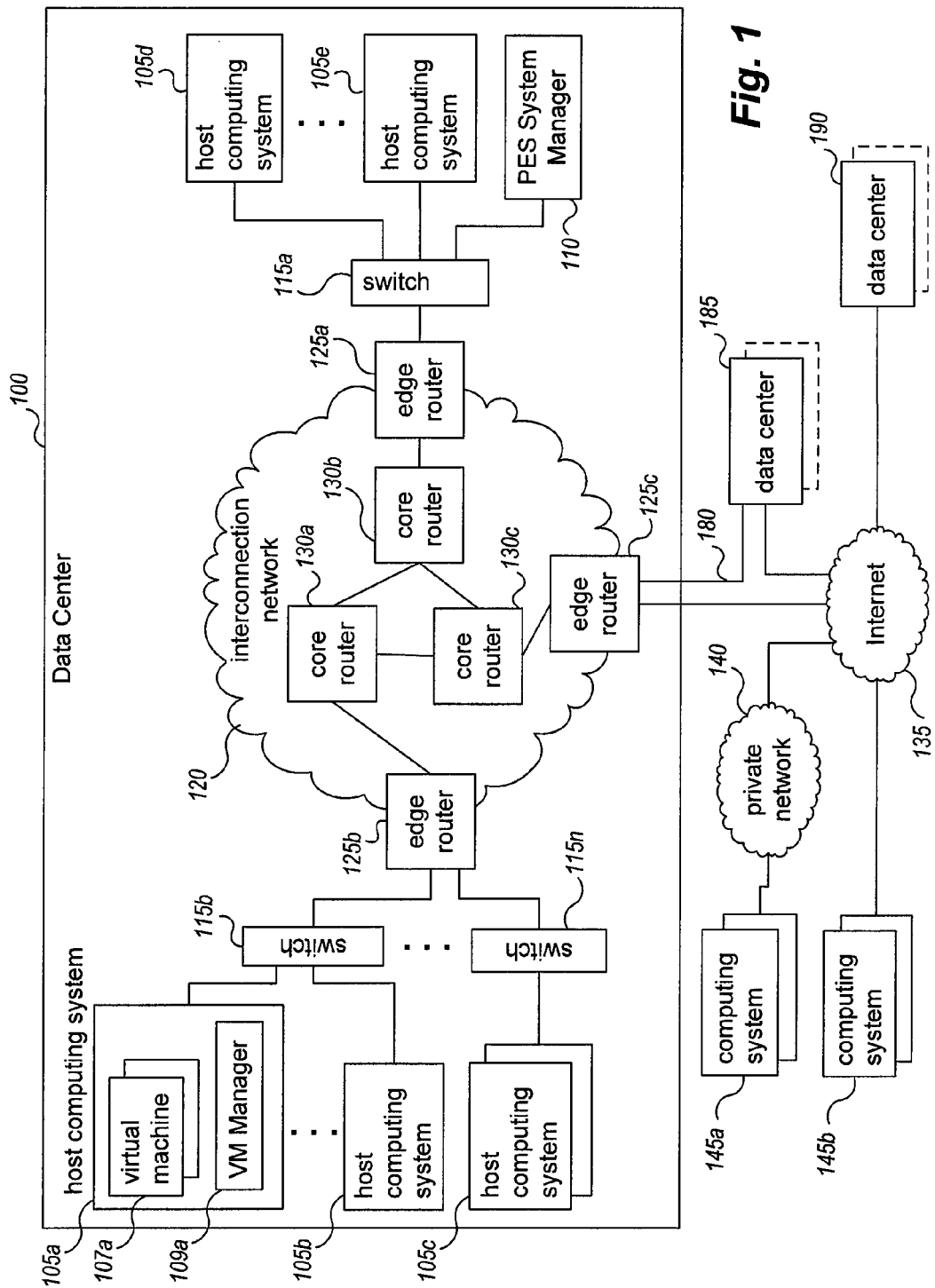
FIG. 1 is a network diagram illustrating an example embodiment in which multiple computing systems execute programs and inter-communicate.

Techniques are described for managing execution of programs on multiple computing systems, such as based at least in part of user-specified constraints related to the program execution. The user-specified constraints may have various forms in various embodiments, as discussed below. In addition, in at least some embodiments, at least some of the computing systems are part of a program execution service for executing multiple programs on behalf of multiple users of the service, such as a program execution service that uses multiple computing systems on multiple physical networks (e.g., multiple physical computing systems and networks within one or more data centers in one or more geographical locations), and at least some of the computing systems each may provide multiple virtual machines that are each capable of executing one or more programs for one or more users. In at least some embodiments, the described techniques are automatically performed by an embodiment of a System Manager component to manage execution of programs for a program execution service or other group of multiple computing systems that execute programs, as described in greater detail below.

In at least some embodiments, specified requirements or other constraints related to execution of one or more copies of a program include constraints based on a desired relative location of one or more indicated targets to one or more host computing systems to execute the one or more program copies, such as constraints specified by a user for execution of one or more programs for the user. A desired relative location to an indicated target may be specified in various ways in various embodiments, and indicated targets may have various forms in various embodiments.

As one illustrative example, a particular user may desire to simultaneously execute multiple copies of a first program (e.g., to act as alternatives in providing functionality to clients of the first program), with the user desiring that the multiple program copies each be executed on a distinct host computing system that is sufficiently distant from other host computing systems executing copies of the program so as to provide a desired level of reliability in case of a failure event that affects access to one or more of the executing program copies (e.g., a hardware failure of one of the host computing systems executing a program copy, a failure of a networking device connecting multiple computing systems, failure of power and/or network connectivity to a data center having numerous computing systems, etc.), such as to minimize the risk that access to all of the multiple executing program copies will be simultaneously lost due to the failure event. In such a situation, the indicated targets are the host computing systems executing other copies of the program, and the relative location may be specified as exceeding an indicated degree of proximity or closeness (e.g., as a minimum distance) between the various target host computing systems for the program copies, such as to have at least two (or all) of those host computing systems be connected via a different network switch device, be located in different data centers, be located in different geographic areas, etc.

Furthermore, the same user may desire to also simultaneously execute multiple copies of a second program, with the second program copies each configured to interact during execution with at least one of the executing first program copies. For example, the first and second programs may be part of a multi-tier architecture, such as with the first program being an application server program that interacts with a database server program to obtain relevant data (e.g., as part of implementing business logic for a particular Web site or other network-based service), and with the second program being the database server program that provides access to data. One or more other related programs may also optionally be part of such a multi-tier architecture, such as a front-end Web server program that interacts with Web clients to receive requests and with the application server program to obtain responses to the requests. In such situations, the user may similarly desire that the copies of the second program execute on distinct host computing systems that are sufficiently non-proximate from each other to minimize reliability problems due to failure events, but further that each executing copy of the second program is sufficiently proximate to at least one executing copy of the first program so that communications between such first program copies and second program copies have at least a minimum level of desired network connectivity performance (e.g., a maximum amount of latency, a minimum amount of throughput or available bandwidth, etc.). In such a situation, the indicated targets for a host computing system to execute a second program copy may include one or more target host computing systems that execute other copies of the second program, and may further include one or more target host computing systems that execute copies of the first program. Furthermore, the relative location with respect to target host computing systems executing other second program copies may similarly be specified as exceeding an indicated degree of proximity (e.g., a minimum distance), while the relative location with respect to a target host computing system executing a first program copy may be specified as being within a minimum degree of proximity (e.g. a maximum distance), such as to have the two computing systems be located in the same data center, to be connected via a single network router device (e.g., on different switched sub-networks), to be the same computing system executing both programs concurrently, etc.

Constraints related to execution of one or more copies (or "instances") of a program on one or more host computing systems at desired locations relative to one or more indicated targets may be specified in various ways, such as based at least in part on a hierarchy or other organization of multiple host computing systems that are available to execute program copies. As previously noted, in some embodiments, a program execution service may execute software programs on behalf of third-party users who are customers of the program execution service, such as by using multiple physical host computing systems (e.g., in one or more data centers in one or more geographic areas, and with at least some of the host computing systems each providing multiple virtual machines each able to execute one or more programs for a customer). In such situations, the organization of the host computing systems of the program execution service may be used to specify relative locations for host computing systems to execute particular program copies, as discussed below. In addition, satisfaction of such specified constraints may be automatically performed by a System Manager component of such a program execution service that manages execution of programs of customers, such as to execute customers' programs in accordance with constraints specified by the customers. For example, customers may provide programs to be executed to the execution service, and may reserve or otherwise request execution time and other resources on physical or virtual hardware facilities provided by the execution service. Additional details related to example embodiments of such a program execution service are included below, including with respect to FIGS. 1 and 2.

In embodiments in which multiple computing systems are available to execute programs and are inter-connected in various ways (e.g., multiple computing systems associated with a program execution service, or another group of such multiple computing systems), a hierarchy or other organization of the multiple computing systems may be specified at least in part based on the type of data exchange mediums or other network connectivity provided between the multiple computing systems. For example, in some embodiments, a user may be able to select one or more of multiple defined proximity levels in order to indicate a desired relative location between a host computing system to be selected to execute a program copy and an indicated target computing system or other target computing resource, such as the following illustrative proximity levels:

a first proximity level corresponding to the host computing system and the target computing system being the same, such as to enable two or more programs on the computing system to inter-communicate via memory;

a second proximity level corresponding to the host and target computing systems being connected by a network switch device and/or by being on a single rack, such as to enable programs on the host and target computing systems to inter-communicate via the switch and/or via a backplane or other bus of the rack;

a third proximity level corresponding to the host and target computing systems being connected by one or more network router devices (e.g., an edge aggregation router, or other router that inter-connects multiple switches or racks), such as to enable programs on the host and target computing systems to inter-communicate via the router(s);

a fourth proximity level corresponding to the host and target computing systems being connected by a network local to a data center, such as to enable programs on the host and target computing systems to inter-communicate via the local network;

a fifth proximity level corresponding to the host and target computing systems being connected by one or more high-speed dedicated data connections between a ring of two or more data centers (e.g., data centers in a common geographical area, such as a state or region), such as to enable programs on the host and target computing systems to inter-communicate via the high-speed data connections; and a sixth proximity level corresponding to the host and target computing systems being in different data centers that are in different geographic areas (e.g., in different states or countries), such as to enable programs on the host and target computing systems to inter-communicate via the Internet or other connection between the data centers.

Each such proximity level may be considered to reflect a distinct associated degree of proximity between the host and target computing systems (e.g., physical proximity and/or network connectivity proximity) and a degree of reliability in case of occurrence of a failure event, with the first level having the highest degree of proximity and having the lowest degree of reliability, and the sixth level having the lowest degree of proximity and the highest degree of reliability. A user may select one or more such proximity levels in various ways in various embodiments, such as by indicating a particular proximity level, or instead a range of multiple proximity levels (e.g., based on an indicated minimum desired degree of proximity and/or an indicated maximum desired degree of proximity), optionally with an indicated preference to maximize or minimize proximity (or reliability) within the range if possible. It will be appreciated that other embodiments may have additional proximity levels, may lack some or all of the illustrative proximity levels, or may represent relative locations in manners other than such proximity levels. Furthermore, it will be appreciated that in at least some embodiments some or all of the proximity levels may be hierarchical, such that a group of computing systems at a second proximity level may include one or more groups of computing systems at a first proximity level, a group of computing systems at a third proximity level may include one or more groups of computing systems at a second proximity level, etc. In addition, in some embodiments, an indication of a proximity level (or other related degree of proximity) may correspond not to a physical degree of proximity based on distance or network connectivity, but instead to a level of quality of service or other computing performance (e.g., reliability in case of a failure event, network connectivity performance, etc.) that is provided for a host computing system selected for that proximity level, regardless of whether that level of computing performance is provided based on a physical degree of proximity or in another manner.

As previously noted, a relative location may be determined with respect to various types of target computing systems in various ways. For example, constraints may be specified with respect to computing systems executing multiple copies of a single program and/or to computing system executing copies of multiple programs, such as to locate an executing program copy providing computing functionality near an executing program copy providing related storage functionality (e.g., to locate an executing application server program copy near an executing database server program copy). In other embodiments, other types of targets may be indicated and used, such as to execute one or more program copies within a specified geographical distance or other degree of proximity to an indicated location (e.g., to execute a program copy for a company or other entity near other computing resources maintained by the entity, such as near a corporate headquarters for a company, and/or near a location in which end-users of a particular program are located). In addition, in some embodiments a target may correspond to a geographical area (e.g., as defined by a governmental body, such as a city, county, state, country, region, etc.), and the relative location may refer to a host computing system being selected to be inside or outside the boundaries of that geographical area (e.g., due to legal restrictions, so as to enhance functionality provided to end-users of a particular program located in that geographical area, etc.).

In addition, in some embodiments at least some constraints specified by a user or otherwise considered by a System Manager component when selecting a host computing system for an executing program copy may be related to factors other than location. For example, a particular user may specify constraints related to capabilities of a host computing system that is to be selected to execute a program of the user, such as resource criteria related to execution of each copy of the program (e.g., an amount of memory, an amount of processor usage, an amount of network bandwidth, and/or an amount of disk space), and/or specialized capabilities available only on a subset of multiple computing systems used to execute programs (e.g., particular input/output devices; particular programs, such as an operating system and/or application programs, etc.). In addition, in some embodiments, a particular user may specify constraints related to costs, such as based on a pricing plan selected by the user (e.g., so that only computing systems available within that pricing plan are selected), or on other fees associated with use of particular computing systems. In addition, a System Manager component may also select and use various constraints related to program execution (e.g., to enhance operation of a program execution service or use of another group of multiple computing systems executing programs) in at least some embodiments, such as related to a quantity of computing system resources that a particular user may use (e.g., not more than half of a particular host computing system that provides multiple virtual machines, at most a specified number or percentage of computing systems in a data center or of all of the multiple computing systems, etc.), related to locations of computing systems used for particular users or particular programs, related to particular computing systems that particular users may use, etc. Various other types of constraints may similarly be specified by users and/or by a System Manager component in at least some embodiments.

In at least some embodiments, the execution of one or more program copies on one or more computing systems may be initiated in response to a current execution request for immediate execution of those program copies by a user. Alternatively, the program copy execution may be initiated in other manners in other embodiments, such as based on a previously received program execution request that scheduled or otherwise reserved the then-future execution of those program copies for the now-current time. Program execution requests may be received in various ways, such as directly from a user (e.g., via an interactive console or other GUI provided by the program execution service), or from an executing program of a user that automatically initiates the execution of one or more copies of other programs or of itself (e.g., via an API, or application programming interface, provided by the program execution service, such as an API that uses Web services).

In addition to constraint-related information, program execution requests may include various other information to be used in the initiation of the execution of one or more program copies in at least some embodiments, such as an indication of a program that was previously registered or otherwise supplied for future execution, and a number of copies of the program that are to be executed simultaneously (e.g., expressed as a single desired number of copies, as a minimum and maximum number of desired copies, etc.). Furthermore, in some embodiments, program execution requests may include various other types of information, such as the following: an indication of a user account or other indication of a previously registered user (e.g., for use in identifying a previously stored program and/or in determining whether the requested program copy execution is authorized); an indication of a payment source for use in providing payment to the program execution service for the program copy execution; an indication of a prior payment or other authorization for the program copy execution (e.g., a previously purchased subscription valid for an amount of time, for a number of program execution copy, for an amount of resource utilization, etc.); and/or an executable or other copy of a program to be executed immediately and/or stored for later execution. In addition, in some embodiments, program execution requests may further include a variety of other types of preferences and/or requirements for execution of one or more program copies, such as that some or all of the program copies each be allocated indicated resources during execution.

When one or more constraints are identified to be used for selecting a host computing system to execute a copy of a program, whether as specified by a user or otherwise determined, the System Manager component uses the identified constraint(s) to select an appropriate host computing system if possible. In particular, in the illustrated embodiment, the System Manager component first attempts to determine one or more candidate host computing systems that are available to execute the program copy and that satisfy the identified constraint(s), such as by incrementally applying the identified constraint(s) to multiple possible computing systems in such a manner as to eliminate any of the multiple computing systems that do not satisfy one of the constraints. In other embodiments, other types of constraint satisfaction techniques may instead be used. In addition, in the illustrated embodiment, the System Manager component may also apply other factors when determining any candidate host computing systems, such as to eliminate from consideration any computing systems that lack sufficient resources to currently execute the program copy (e.g., based on one or more other programs being executed or that are scheduled to be executed), and/or that are currently unavailable or expected to be unavailable for other reasons (e.g., periodic maintenance).

If one or more candidate host computing systems are determined, one of the candidate host computing systems is selected as the host computing system to execute the program copy (or multiple host computing systems may be selected if multiple program copies are to be executed on more than one host computing system). If multiple candidate host computing systems are determined, the particular host computing system may be selected in various ways, such as randomly, or in such a manner as to enhance operation of the program execution service (e.g., by attempting to use under-utilized groups of computing systems, by using a computing system that has a lowest cost of operation, etc.). In some embodiments, a user who specified the identified constraints may further have one or more preferences that may be used to select the host computing system, whether a preference indicated with a program copy execution request that specified the identified constraints and initiated the candidate host computing system determination, or a previously specified and stored preference. For example, if the specified constraints include a range of multiple proximity levels, the user may specify a preference as to which end of the range to use if possible, such as to prefer to select the host computing system to be more proximate or less proximate to a target (or more reliable or less reliable) if possible.

If no candidate host computing systems are determined, an error or other indication may be returned to provide notification that no computing systems that satisfy the identified constraint(s) are currently available to execute the program copy. If the identified constraint(s) were specified by a user, the user may then decide to request execution of the program copy using other constraints (e.g., less restrictive constraints, such as with a less restrictive degree of proximity), or to instead attempt to perform the program execution using the same constraints at a later time. In other embodiments, the System Manager component may further facilitate such constraint relaxation, such as by automatically determining one or more less restrictive constraints under which the program copy may be executed (e.g., if at least one of the constraints indicates a maximum proximity level that is less than the highest proximity level, by progressively trying to use proximity levels higher than the indicated maximum until one or more available candidate host computing systems are determined) and providing an indication of the ability to perform the program copy execution using the less restrictive constraints. Alternatively, the System Manager component may automatically determine a later time at which the program copy may be executed on a host computing system under the identified constraints (e.g., based on scheduled executions of other program copies), and indicate that availability (e.g., enabling a user to schedule the program copy execution at that later time).

Furthermore, in some embodiments the System Manager component may determine to move at least some executing programs in at least some situations from their current host computing systems to other host computing systems, such as if no candidate host computing systems is determined for a particular program copy execution request, if a computing system fails or access is otherwise lost to one or more computing systems, if an executing program copy terminates prematurely, periodically, etc. If so, the System Manager component may, for one or more program copies already executing on a current host computing system, determine another host computing system to execute the program copy instead of the current host computing system such that the other host computing system satisfies any constraints related to execution of the program copy (e.g., at a same or better level with respect to any user preferences regarding the program copy execution, or instead at any level that satisfies the constraints), and optionally such that one or more other system goals are achieved (e.g., to make available a candidate host computing system for a program copy execution request by moving a previously executing program copy on that candidate host computing system to another host computing system, to improve utilization of at least some computing systems, etc.).

In addition, in some embodiments a user may specify constraints to be used for a particular request to execute a copy of a program by indicating a predefined group of constraints, such as a group previously defined by the user (e.g., so that the group may be re-used multiple times, such as for multiple copies of a single program or for multiple distinct programs). Alternatively, in some embodiments, multiple predefined groups may be provided by the System Manager component for the program execution service or other group of multiple computing systems being managed, such as the following non-exclusive list of example predefined groups: a group corresponding to providing high failure reliability for multiple copies of a program, a group corresponding to providing high network connectivity performance between multiple copies of a program, a group corresponding to providing a high degree of proximity between multiple copies of a program, one or more groups that each correspond to a particular geographical area and/or a particular subset of the multiple computing systems available to execute programs, etc., and with some or all such groups optionally further specifying a preference for greater proximity and/or for less proximity within a corresponding range. Thus, if a user expects to execute multiple copies of a program (e.g., by initiating executions of all of the copies at a single time or instead incrementally), and would like them to execute in particular locations relative to each other, the user may in at least some embodiments define or select a group of one or more constraints that correspond to those desired relative locations, and then execute each copy of the program as part of that defined/selected group. Furthermore, in some embodiments, a user may define multiple such groups of constraints, and further specify one or more constraints between such groups. Thus, with respect to the previously discussed illustrative example involving an application server program and a database server program, a user may define a first group corresponding to execution of multiple copies of the application server program and a second group corresponding to execution of multiple copies of the application server program, and indicate inter-group constraints for the two groups (e.g., to indicate a minimum degree of proximity between executing program copies of the two groups, such as to ensure sufficient proximity between copies of the two programs).

For illustrative purposes, some embodiments are described below in which specific types of computing systems, networks, intercommunications, and configuration operations are performed. These examples are provided for illustrative purposes and are simplified for the sake of brevity, and the inventive techniques can be used in a wide variety of other situations, some of which are discussed below. For example, while the described techniques are in some embodiments used in the context of one or more data centers housing multiple physical computing systems and/or in the context of a program execution service, other implementation scenarios are also possible, such as in the context a business or other entity (e.g. a university, non-commercial organization, etc.) for the benefit of its employees and/or members.

FIG. 1 is a network diagram illustrating an example embodiment in which intercommunications between computing systems of a program execution service are configured by a system manager component of the program execution service. The illustrated example includes a data center 100 operated by the program execution service that is connected to a global internet 135 external to the data center 100. The global internet 135 may be a publicly accessible network of networks, possibly operated by various distinct parties, such as the Internet. In this example, the global internet 135 provides access to various external computing systems, such as computing systems 145a via private network 140 and computing systems 145b. The private network 140 may be, for example, a corporate network that is wholly or partially inaccessible from non-privileged computing systems external to the private network 140. Computing systems 145b may include, for example, a home computing system that connects directly to the Internet (e.g., via a telephone or cable modem, a Digital Subscriber Line ("DSL"), etc.). In addition, other data centers are illustrated, including one or more other data centers 185 that are connected to data center 100 via one or more dedicated private high-speed data connections 180 (e.g., other data centers that are part of a ring of multiple data centers that include data centers 100 and 185, such as in a common geographic area), and one or more other data centers 190 that are connected to data center 100 via the internet 135 (e.g., other data centers that are geographically distant from data center 100).

The data center 100 includes a number of physical host computing systems 105a-105e and a System Manager component 110 of the program execution service. In this example, host computing system 105a includes multiple virtual machines 107a and a virtual machine ("VM") Manager component 109a to manage those virtual machines (e.g., a hypervisor or other virtual machine monitor), and some or all of the other host computing systems 105b-105e may similarly have such virtual machines and/or VM Manager components (not shown). Alternatively, in other embodiments, some or all of the physical host computing systems at the data center may not provide any virtual machines, such as to instead directly execute one or more software programs on behalf of a customer of the program execution service. Furthermore, in some embodiments various of the host computing systems may have differing capabilities, may have different associated fees for use, may support different types of user programs (e.g., virtual machine program instances of different sizes, or programs with different types of resource criteria and/or computing resource usage, such as differing patterns of I/O and memory access and network usage), etc. If so, particular users and/or their programs may be grouped (e.g., automatically) according to one or more such factors, which may further be used as constraints and/or preferences regarding which host computing systems to select for particular program copies.

The data center further includes multiple networking devices, such as switches 115a and 115b-115n, edge routers 125a-125c, and core routers 130a-130c. Switch 115b is part of a physical network that includes two or more physical host computing systems 105a-105b, and is connected to edge aggregation router 125b. Edge aggregation router 125b connects the switched network for switch 115b to an interconnection network 120 of the data center, and further in the illustrated embodiment connects one or more other switches 115n (and their switched networks of host computing systems 105c) to each other, to switch 115b, and to the interconnection network. Switch 115a is part of a distinct physical network that includes physical computing systems 105d-105e and a computing system providing the PES System Manager component 110, and is connected to edge router 125a. Numerous other computing systems and networking devices, including other switches connected to edge router 125a, may be present, but are not illustrated here for the sake of brevity. The physical networks established by switch 115a and by switches 115b-115n are connected to each other and other networks (e.g., the global internet 135) via the interconnection network 120, which includes the edge routers 125a-125c and the core routers 130a-130c. The edge routers 125a-125c provide gateways between two or more networks. For example, edge router 125a provides a gateway between the physical network established by switch 115a and the interconnection network 120. Edge router 125c provides a gateway between the interconnection network 120 and global internet 135, as well as to the dedicated high-speed data connection 180. The core routers 130a-130c manage communications within the interconnection network 120, such as by forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on network topology, etc.).

The illustrated PES System Manager component 110 performs at least some of the described techniques in order to manage execution of programs on the physical host computing systems 105a-105e, as described in greater detail elsewhere. When a particular host computing system is selected to execute one or more program copies, the System Manager component may in some embodiments initiate execution of those program copies by interacting with a VM Manager component (or other manager component if the selected host computing system does not provide virtual machines) that controls execution of programs for that selected host computing system for the program execution service, or may alternatively directly execute the program copy on the selected host computing system.

Figure 2:
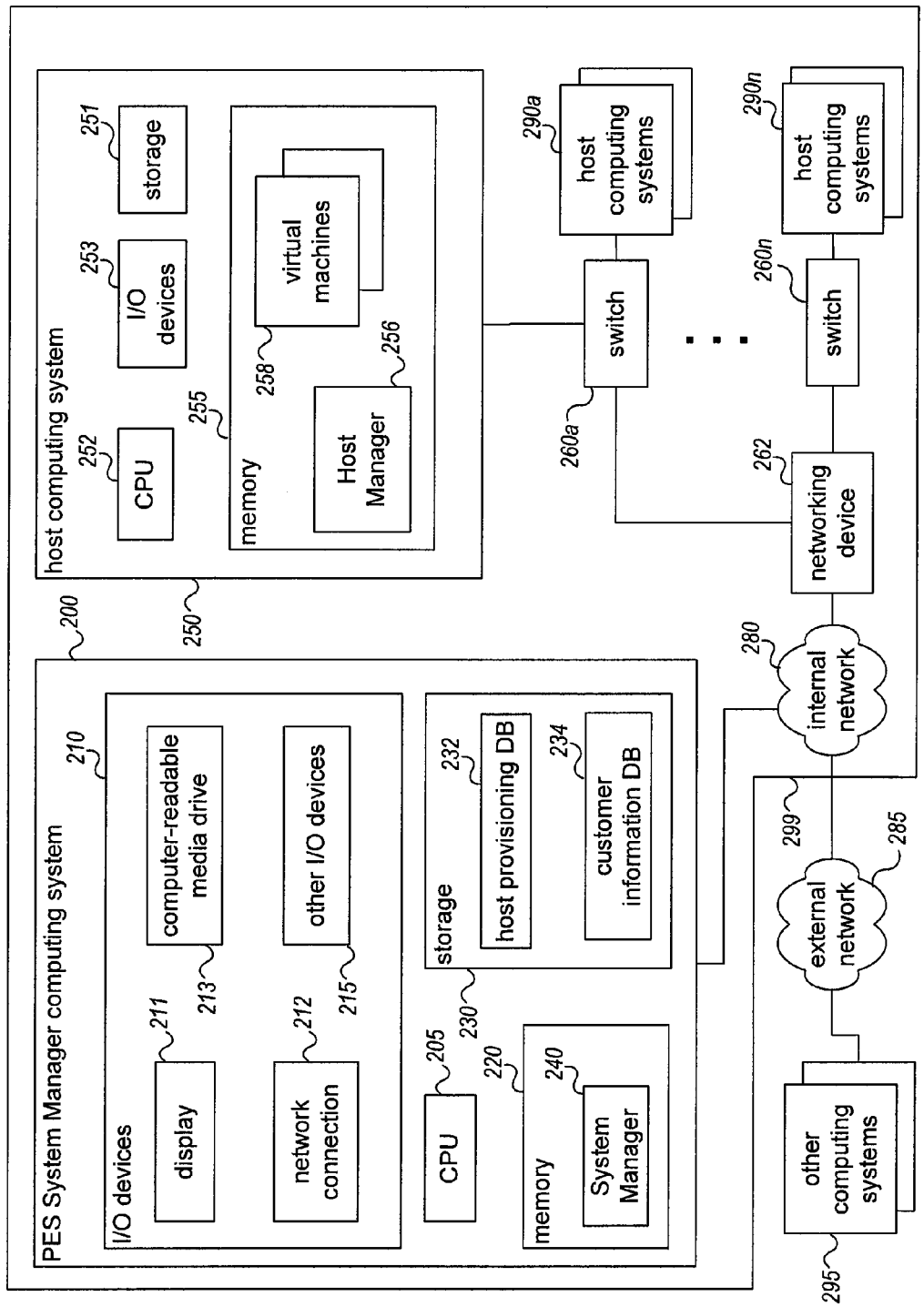
FIG. 2 is a block diagram illustrating example computing systems suitable for executing an embodiment of a system for managing execution of programs by a program execution service.

FIG. 2 is a block diagram illustrating example computing systems suitable for executing an embodiment of a system for managing execution of programs on multiple host computing systems. In particular, FIG. 2 illustrates an example data center 299 that provides a program execution service. The data center 299 includes a Program Execution Service ("PES") System Manager computing system 200, a host computing system 250 capable of executing user programs on virtual machines 258, and other host computing systems 290a-290n capable of executing user programs (e.g., with at least some of the host computing systems 290a-290n each similarly providing one or more virtual machines and/or each executing a single user program at a time). The PES System Manager computing system 200 and host computing systems 250 and 290a-290n are connected to one another via an internal network 280 and various networking devices that include an illustrated networking device 262 and network switch devices 260a-260n. The network 280 may, for example, be an interconnection network that joins multiple disparate physical networks within the data center 299 and possibly provides access to external networks and/or systems, such as computing systems 295 (e.g., in one or more other data centers) via external network 285 (e.g., the Internet). In the illustrated example, the networking device 262 provides a gateway between the network 280 and host computing systems 250 and 290a-290n, such as by acting as a router or a bridge.

The PES System Manager computing system 200 functions to manage the execution of user programs within the data center 299. The illustrated PES System Manager computing system embodiment 200 includes a CPU 205, various I/O components 210, storage 230, and memory 220. The illustrated I/O components include a display 211, network connection 212, computer-readable media drive 213, and other I/O devices 215 (e.g., a mouse, keyboard, speakers, microphone, etc.).

Host computing system 250 functions to host one or more programs being executed on behalf of one or more customers, and is shown in additional detail relative to host computing systems 290a-290n for illustrative purposes. The host computing system 250 includes a CPU 252, I/O components 253, storage 251, and memory 255. A host computing system manager component 256 is executing in the memory 255, and one or more user programs may also be executing in the multiple virtual machines 258 in memory. The structure of the other host computing systems 290a-290n may be similar to that of host computing system 250. In a typical arrangement, data center 299 may include hundreds or thousands of host computing systems such as those illustrated here, organized into a large number of distinct physical networks (e.g., in a hierarchical manner).

An embodiment of a PES System Manager component 240 is executing in memory 220. In some embodiments, the System Manager component 240 may receive a request or other indication from a user (e.g., using one of the other computing systems 295) to execute one or more copies of a program in accordance with one indicated execution constraints. The System Manager component 240 may then attempt to identify or otherwise determine one or more candidate host computing systems based on the execution constraints, such as from the host computing systems of the data center 299 and/or from host computing systems on one or more other data centers (not shown), such as by interacting with System Manager components on those other data centers or instead by directly managing the host computing systems for multiple data centers. After identifying one or more candidate host computing systems, the System Manager component selects one or more particular host computing systems to execute the one or more program copies for the user. In some cases, the System Manager component may use various information when determining candidate host computing systems and selecting particular host computing systems, such as information about the structure or other organization of the various host computing systems, such as may be stored in a host provisioning database ("DB") data structure 232 on storage 230, and/or information about customer users (e.g., customer preferences, customer-defined constraint groups, information about customers' programs, etc.), such as may be stored in a customer information database data structure 234 on storage 230.

It will be appreciated that computing systems 200, 250, 290a-290n, and 295, and networking devices 260a-260n and 262, are merely illustrative and are not intended to limit the scope of the present invention. For example, computing system 200 may be connected to other devices that are not illustrated, including through one or more networks external to the data center 299 such as the Internet or via the World Wide Web ("Web"). More generally, a computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate intercommunication capabilities. In addition, the functionality provided by the illustrated components may in some embodiments be combined in fewer components or distributed in additional components. Similarly, in some embodiments the functionality of some of the illustrated components may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components and data structures may also be stored (e.g., as software instructions or structured data) on a computer-readable medium, such as a hard disk, a memory, a network, or a portable media article to be read by an appropriate drive or via an appropriate connection. The components and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3A:
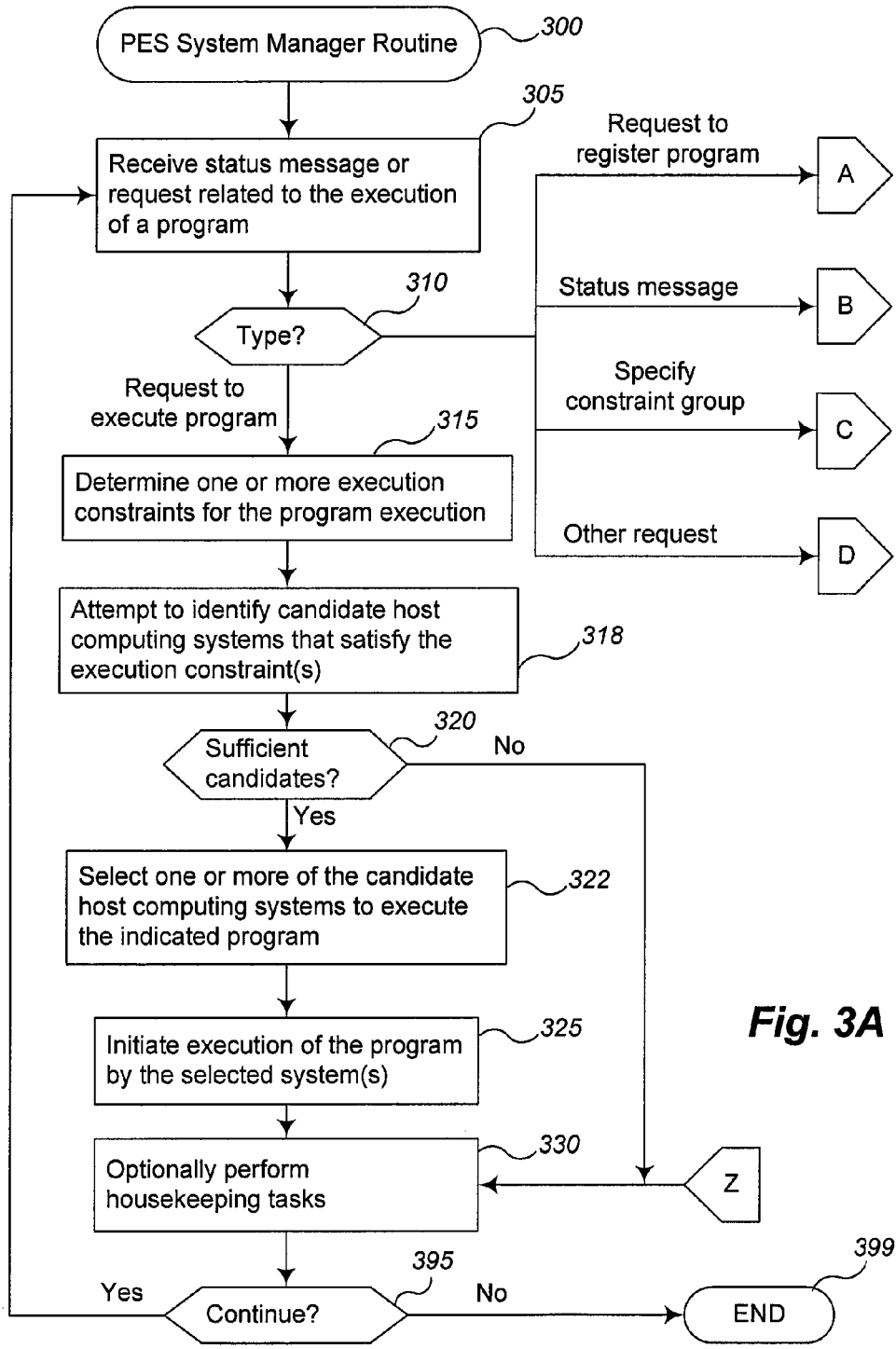
FIGS. 3A and 3B illustrate a flow diagram of an example embodiment of a System Manager routine.
Figure 3B:
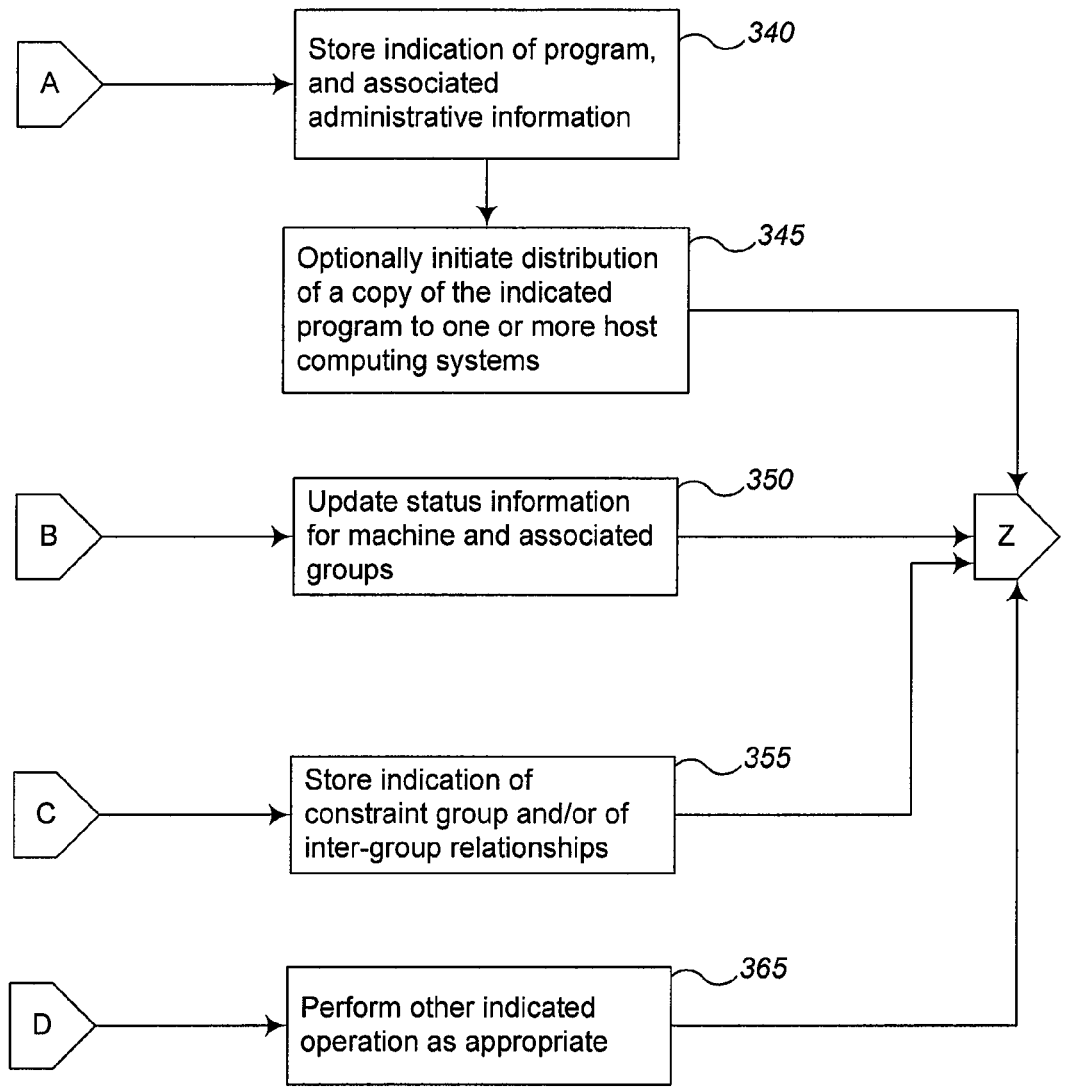

FIG. 3 illustrates a flow diagram of an example embodiment of a System Manager routine 300. The routine may be provided by, for example, execution of the PES System Manager components 110 of FIG. 1 and/or 240 of FIG. 2 in order to manage program execution for a program execution service, or instead by a similar System Manager component to manage execution of programs for another group of multiple computing systems (e.g., multiple computing systems of a business or other entity in order to manage execution of internal programs for that entity).

The illustrated embodiment of the routine 300 begins at block 305, where a request related to the execution of a program or a status message related to program execution is received. In this embodiment, the request may be received from various sources internal or external to the program execution service (e.g., a remote customer user requesting execution of one or more copies of an indicated program). In block 310, the routine determines the type of request received.

If it is determined in block 310 that the request is to execute one or more copies of a program, the routine continues with block 315. In block 315, the routine determines one or more execution constraints related to the program copy execution, such as based on constraints specified by a user as part of the request received in block 305 (e.g., by receiving an indication of a predefined group of constraints) and/or based on constraints automatically determined as being beneficial to operation of the program execution service and/or for the user. The routine then continues to block 318 to attempt to identify one or more candidate host computing systems that satisfy the determined execution constraints and are otherwise available to execute at least one of the program copies. If it is determined in block 320 that sufficient candidate host computing systems are not available (e.g., at least one candidate host computing system for each program copy), the routine may optionally provide an error or other status response (not shown) to the user from whom the request was received in block 305, and then continues to block 330. Otherwise, the routine continues to block 322 to select one or more of the candidate host computing systems to each execute at least one copy of the program, and in block 325 initiates execution of those program copies on those selected host computing systems.

If it is instead determined in block 310 that the request received in block 305 is to register a program of a user for later use (e.g., to provide a copy of the program to the program execution service for storage, to provide information about resource criteria for the program, to provide information about one or more predefined constraint groups to which the program belongs, etc.), the routine continues to block 340. In block 340, the routine stores provided information about the program, and in block 345 optionally proceeds to provide one or more copies of the program to one or more distributed storage locations near to or otherwise associated with particular subsets of the host computing systems (e.g., to local program caches at each of one or more data centers). Alternatively, if it is determined in block 310 that the request received in block 305 is for a user to define a constraint group for later use, the routine continues instead to block 355 to store an indication of the constraint group and any inter-group constraints. If it is instead determined in block 310 that a message is received in block 305 with status information related to execution of programs by host computing systems (e.g., periodic reports on amounts of resource usage on various host computing systems, a report of a failure of a computing system or other hardware device, a report of a failure of an executing program copy based on its early termination, etc.), the routine continues instead to block 350 to store that status information for later use (e.g., for use in selecting particular host computing systems). Otherwise, if it is instead determined in block 310 that some other type of request or message is received in block 305, the routine continues to block 365 to handle the request or message as appropriate.

After blocks 325, 345, 350, 355 or 365, the routine continues to block 330 to optionally perform any periodic housekeeping operations (e.g., to determine whether to move some executing program copies from current host computing systems to other host computing systems, such as to balance utilization of resources or for other reasons). After block 330, the routine continues to block 395 to determine whether to continue, and if so returns to block 305. If not, the routine continues to block 399 and ends.

Figure 4:
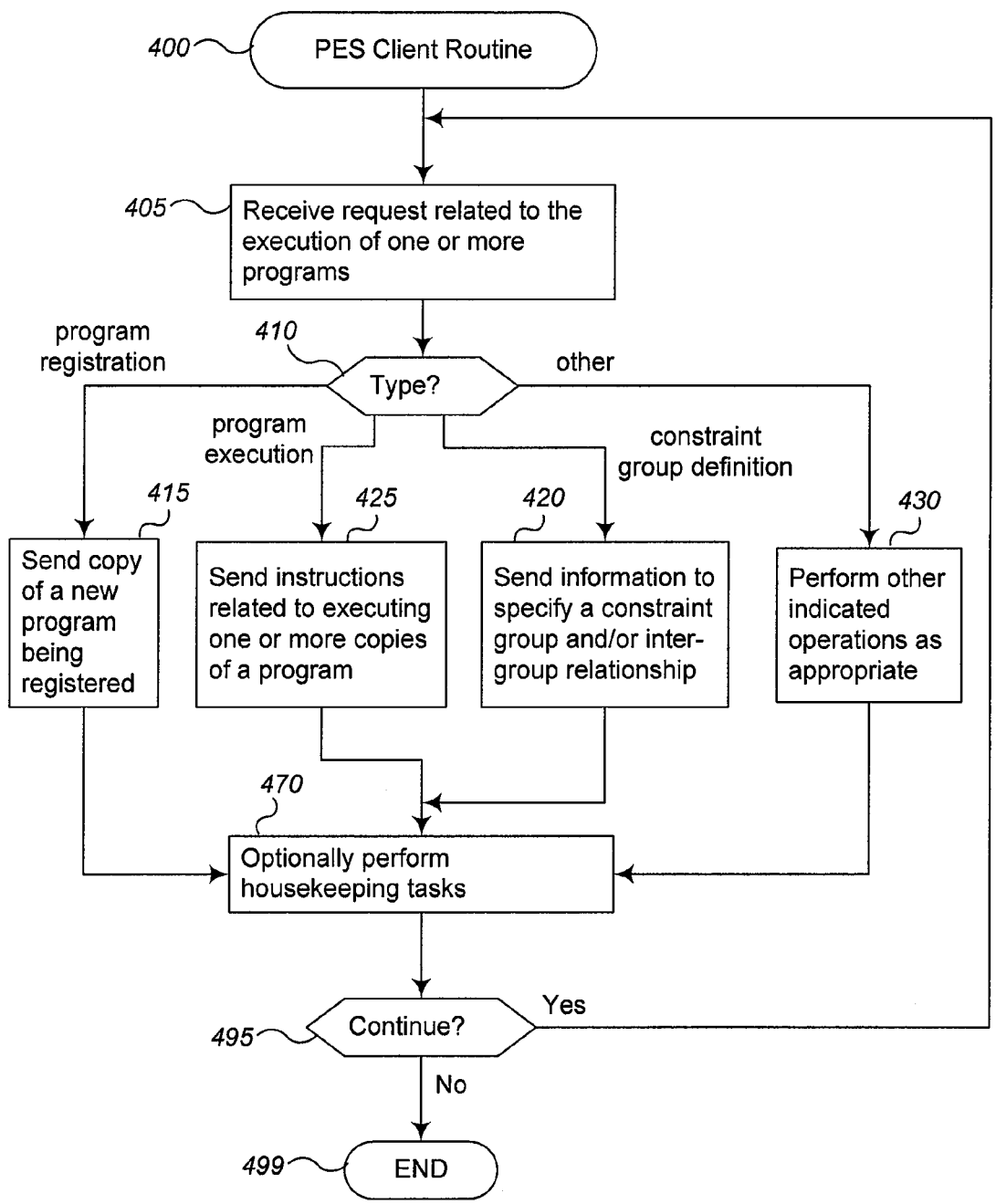
FIG. 4 illustrates a flow diagram of an example embodiment of a System Client routine.

FIG. 4 illustrates a flow diagram of an example embodiment of a client routine 400 of a program execution service, although in other embodiments a similar routine may act as a client for one or more other groups of multiple computing systems that may execute programs. The routine may be provided by, for example, an application (not shown) executing on one of the computing systems 145 of FIG. 1 or computing systems 295 of FIG. 2, such as to provide an interactive console to allow a human user to interact with the program execution service.

The routine begins at block 405, where it receives instructions from a user or another type of message related to the execution of one or more copies of one or more programs. In block 410, the routine determines the type of the received message. If the message is related to registration of a new program (or a new version of a previously registered program), the routine proceeds to block 415 and sends an indication of the new program to be registered to the program execution service (e.g., to a System Manager component of the program execution service that manages program execution). If the message is instead determined in block 410 to be related to defining a constraint group for later use, the routine proceeds to block 420 to send a request to the program execution service (e.g., to a System Manager component of the program execution service) to define the constraint group, such as by indicating one or more execution constraints for the group and/or between the group and one or more other constraint groups (e.g., individual constraints specified in accordance with a defined API of the program execution service, such as by selecting from a list of constraints provided by the program execution service and/or by specifying a constraint in a defined format using XML or other data format). If the message is instead determined in block 410 to be related to the execution of a program, the routine proceeds to block 425 to send a request to the program execution service (e.g., to a System Manager component of the program execution service) to execute one or more copies of a program, such as with one or more indicated execution constraints (e.g., individual constraints specified in accordance with a defined API of the program execution service, by selecting a predefined constraint group, etc.). If it is instead determined in block 410 that some other type of request is received, the routine proceeds to block 430 and performs other indicated operations as appropriate. For example, the routine may send a request to the program execution service to reserve computing resources at a future time to execute one or more indicated program copies, send a status query to the program execution service regarding current or prior execution of one or more programs, provide or update user-related information (e.g., as part of registering the user with the program execution service), de-register or otherwise remove previously registered programs, suspend or terminate execution of one or more program copies, etc.

After blocks 415, 420, 425, or 430, the routine continues to block 470 and optionally performs housekeeping tasks, such as to update display information, store information received back from the program execution service (not shown), make periodic status queries of the program execution service, etc. After block 470, the routine proceeds to block 495 to determine whether to continue. If so, the routine returns to block 405, and if not, proceeds to block 499 and ends.

In addition, various embodiments may provide mechanisms for customer users and other users to interact with an embodiment of the program execution service (or other group of multiple computing systems available to execute user programs) in various ways for purposes of executing program copies and managing defined constraint groups. For example, as previously noted, some embodiments may provide an interactive console (e.g. a client application program providing an interactive user interface, a Web browser-based interface, etc.) from which users can manage the creation or deletion of constraint groups, as well as more general administrative functions related to the operation and management of hosted application programs or other programs (e.g., the creation or modification of user accounts; the provision of new programs; the initiation, termination, or monitoring of hosted programs; the assignment of programs to groups; the reservation of time or other system resources; etc.). In addition, some embodiments may provide an API that defines types of constraints that may be specified and/or that allows other computing systems and programs to programmatically invoke at least some of the described functionality. Such APIs may be provided by libraries or class interfaces (e.g., to be invoked by programs written in C, C++, or Java) and/or network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" and U.S. application Ser. No. 11/692,038, filed Mar. 27, 2007 and entitled "Configuring Intercommunications Between Computing Nodes;" each of which is incorporated herein by reference in its entirety.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system of a program execution service to execute programs in locations selected in accordance with user-specified constraints, the program execution service using a plurality of host computing systems in multiple geographic areas to execute programs, the plurality of host computing systems being connected at multiple hierarchical levels that are each associated with a distinct degree of proximity, the multiple hierarchical levels include a succession beginning at a lowest hierarchical level whose associated degree of proximity corresponds to multiple programs executing on a single computing system and ending at a highest hierarchical level whose associated degree of proximity corresponds to multiple geographically distributed rings of computing data centers connected by the Internet, the succession including multiple intermediate hierarchical levels that include a first switch-based hierarchical level whose associated degree of proximity corresponds to a group of multiple computing systems connected by a switch-based common group data exchange medium that is specific to that group, a router-based hierarchical level whose associated degree of proximity corresponds to a group of multiple switch-based computing system groups connected by a router-based data exchange medium, a data center-based hierarchical level whose associated degree of proximity corresponds to a group of multiple router-based computing system groups connected by a local area network of a data center, and a ring hierarchical level whose associated degree of proximity corresponds to multiple geographically proximate data centers connected by one or more dedicated high-speed data connections, the method comprising:

receiving an indication from a user of the program execution service to execute an indicated quantity of copies of an indicated program in such a manner as to satisfy one or more indicated execution constraints, the indicated quantity of program copies including multiple copies, the one or more execution constraints for use by the program execution service in selecting one or more of the plurality of host computing systems to execute the indicated quantity of indicated program copies, the one or more execution constraints specifying one or more degrees of proximity of the selected one or more host computing systems to one or more indicated other target computing systems, the one or more execution constraints further specifying at least one of a minimum and a maximum degree of proximity between at least some of the computing systems executing the multiple indicated program copies with the minimum proximity degree if specified being for use in providing a minimum degree of reliability in case of a failure that affects one or more of the executing multiple indicated program copies and with the maximum proximity degree if specified being for use in providing a minimum degree of network connectivity performance between the executing indicated program copies of the at least some computing systems, the indicated target computing systems being computing systems executing other copies of the indicated program;

automatically determining one or more of the hierarchical levels whose associated degrees of proximity correspond to the one or more degrees of proximity specified by the one or more execution constraints, the automatic determining of the one or more hierarchical levels being performed by a configured computing system of the program execution service;

automatically determining one or more candidate host computing systems that are available to execute the indicated quantity of indicated program copies in accordance with the one or more execution constraints, the candidate host computing systems being connected to the indicated target computing systems at one or more of the determined hierarchical levels, the automatic determining of the one or more candidate host computing systems being performed by the configured computing system;

automatically selecting from the candidate host computing systems the one or more host computing systems to execute the indicated quantity of indicated program copies, such that each of the selected one or more host computing systems is to execute at least one of the indicated program copies, the automatic selecting being performed by the configured computing system; and initiating executing of the indicated quantity of indicated program copies on the selected one or more host computing systems.

2. A computer-implemented method for executing programs in accordance with user-specified constraints, the method comprising:

receiving an indication from a user of one or more execution constraints for use in selecting one or more host computing systems to execute one or more copies of a program, the one or more execution constraints being based on at least one of locations of the one or more computing systems and of capabilities of the one or more computing systems related to executing the one or more program copies, at least one of the one or more execution constraints being based on one or more indicated degrees of proximity between one or more indicated target computing resources and the one or more host computing systems selected to execute the one or more program copies;

automatically determining one or more candidate host computing systems that are available to execute the one or more program copies in accordance with the one or more execution constraints, the determined candidate host computing systems being selected from a predefined group of multiple distributed computing systems for use in executing programs of users of a program execution service and each having a proximity to at least one of the indicated target computing resources that satisfies at least one of the indicated degrees of proximity, the automatic determining being performed by a configured computing system;

automatically selecting the one or more host computing systems to execute the one or more program copies from the candidate host computing systems, such that each of the selected one or more host computing systems is to execute at least one of the one or more program copies, the automatic selecting being performed by the configured computing system; and initiating execution of the one or more program copies on the selected one or more host computing systems.

3. The method of claim 2 wherein the multiple computing systems of the predefined group are inter-connected using multiple data exchange mediums, and wherein a degree of proximity between two computing systems is based at least in part on one or more data exchange mediums that connect the two computing systems.

4. The method of claim 3 wherein the one or more degrees of proximity each correspond to at least one of multiple connection-based proximity levels, the connection-based proximity levels including a level corresponding to multiple programs executing on a single computing system that share a data exchange medium within the single computing system, a level corresponding to a group of multiple computing systems connected by a switch-based data exchange medium, a level corresponding to a group of multiple switched groups of computing systems connected by a router-based data exchange medium, a level corresponding to a group of computing systems of a computing data center connected by a local area network of the data center, a level corresponding to multiple geographically proximate computing data centers connected by one or more dedicated high-speed data connections, and a level corresponding to multiple geographically distributed computing data centers connected by an internet.

5. The method of claim 4 wherein the connection-based proximity levels are hierarchically organized, and wherein the at least one execution constraint indicates a range of one or more of the proximity levels.

6. The method of claim 1 wherein the one or more indicated target computing resources are computing systems that execute one or more indicated programs and/or that store one or more indicated groups of data.

7. The method of claim 2 wherein at least one of the one or more execution constraints is based on a relative location of each of the one or more host computing systems with respect to one or more indicated target computing resources, such that the candidate host computing systems are each selected based at least in part on a relative location of the candidate host computing system with respect to at least one of the indicated target computing resources, wherein the indication from the user further includes an indication of the program for which the one or more copies are to be executed and to execute multiple copies of the indicated program, and wherein the one or more indicated target computing resources are computing systems that each execute at least one copy of the indicated program.

8. The method of claim 2 wherein the one or more program copies include multiple copies, wherein the at least one execution constraints is based on a relative location of each of the one or more host computing systems with respect to the one or more indicated target computing resources, the relative location being based on a range of multiple degrees of proximity between the indicated target computing resources and the one or more host computing systems that execute the multiple program copies, wherein the determined one or more candidate host computing systems include multiple candidate host computing systems have differing degrees of proximity within the range to the one or more indicated target computing resources, and wherein the selecting of the one or more host computing systems from the multiple candidate host computing systems includes selecting host computing systems that have a preferred degree of proximity to the one or more indicated target computing resources.

9. The method of claim 8 wherein the preferred degree of proximity is indicated by the user and is one of a degree of proximity within the range that is most proximate and of a degree of proximity within the range that is least proximate.

10. The method of claim 2 wherein the one or more program copies include multiple copies, and wherein the one or more execution constraints specify a level of performance to be provided by the one or more host computing systems, the specified level of performance including at least one of a minimum degree of reliability in case of a failure that affects a subset of the multiple executing program copies and of a minimum degree of network connectivity performance between the multiple executing program copies, the minimum degree of reliability being based at least in part on the multiple executing program copies being executed on multiple computing systems having at least an indicated lack of proximity, and the minimum degree of network connectivity performance being based at least in part on the multiple executing program copies being executed on one or more computing systems having at least an indicated degree of proximity.

11. The method of claim 2 wherein the one or more execution constraints indicate one or more geographical locations of the one or more host computing systems with respect to one or more governmental boundaries.

12. The method of claim 2 wherein the one or more execution constraints indicate one or more capabilities of the one or more computing systems related to executing the one or more program copies.

13. The method of claim 2 further comprising, before the receiving of the indication from the user, defining a group of one or more execution constraints based on instructions received from the user, and wherein the indication from the user of the one or more execution constraints is based on an indication of the defined group.

14. The method of claim 2 wherein at least one of the one or more host computing systems each hosts multiple virtual machines that are each able to execute at least one program, and wherein the program is a virtual machine image to be executed by at least one virtual machine hosted by each of the at least one host computing systems.

15. The method of claim 2 wherein the configured computing system operates on behalf of the program execution service, wherein the program is one of multiple programs associated with the program execution service by customers of the program execution service, the multiple computing systems being used by the program execution service to execute the multiple programs on behalf of the customers, and wherein the method further comprises receiving multiple requests from multiple users to execute instances of multiple programs, and automatically selecting one or more of the multiple computing systems for use with each of the requests.

16. A non-transitory computer-readable medium whose contents include instructions that when executed configure a computing system to perform a method, the method comprising:

receiving an indication from a user of one or more execution constraints for use in selecting one or more host computing systems to execute one or more copies of a program on behalf of the user, the one or more execution constraints being based on at least one of locations of the one or more computing systems and of capabilities of the one or more computing systems related to executing the one or more program copies, at least one of the one or more execution constraints being based on one or more indicated degrees of proximity between one or more indicated target computing resources and the one or more host computing systems selected to execute the one or more program copies;

automatically determining one or more candidate host computing systems that are available to execute the one or more program copies in accordance with the one or more execution constraints, the determined candidate host computing systems being selected from a predefined group of multiple distributed computing systems for use in executing programs of users of a program execution service and each having a proximity to at least one of the indicated target computing resources that satisfies at least one of the indicated degrees of proximity, the automatic determining being performed by the configured computing system;

automatically selecting the one or more host computing systems to execute the one or more program copies from the candidate host computing systems, such that each of the selected one or more host computing systems is to execute at least one of the one or more program copies, the automatic selecting being performed by the configured computing system; and initiating execution of the one or more program copies on the selected one or more host computing systems.

17. The non-transitory computer-readable medium of claim 16 wherein the multiple computing systems of the predefined group are inter-connected using multiple data exchange mediums, and wherein a degree of proximity between two computing systems is based at least in part on one or more data exchange mediums that connect the two computing systems.

18. The non-transitory computer-readable medium of claim 17 wherein the one or more degrees of proximity each correspond to at least one of multiple connection-based proximity levels, the connection-based proximity levels including a level corresponding to multiple programs executing on a single computing system that share a data exchange medium within the single computing system, a level corresponding to a group of multiple computing systems connected by a switch-based data exchange medium, a level corresponding to a group of multiple switched groups of computing systems connected by a router-based data exchange medium, a level corresponding to a group of computing systems of a computing data center connected by a local area network of the data center, a level corresponding to multiple geographically proximate computing data centers connected by one or more dedicated high-speed data connections, and a level corresponding to multiple geographically distributed computing data centers connected by an internet.

19. The non-transitory computer-readable medium of claim 16 wherein the one or more indicated target computing resources are computing systems that execute one or more indicated programs and/or that store one or more indicated groups of data.

20. The non-transitory computer-readable medium of claim 16 wherein the one or more program copies include multiple copies, wherein the at least one execution constraint is based on a relative location of each of the one or more host computing systems with respect to the one or more indicated target computing resources, the relative location being based on a range of multiple degrees of proximity between the indicated target computing resources and the one or more host computing systems that execute the multiple program copies, wherein the determined one or more candidate host computing systems include multiple candidate host computing systems have differing degrees of proximity within the range to the one or more indicated target computing resources, and wherein the selecting of the one or more host computing systems from the multiple candidate host computing systems includes selecting host computing systems that have a preferred degree of proximity to the one or more indicated target computing resources.

21. The non-transitory computer-readable medium of claim 16 wherein the one or more program copies include multiple copies, and wherein the one or more execution constraints indicate at least one of one or more geographical locations of the one or more host computing systems with respect to one or more governmental boundaries, of one or more capabilities of the one or more computing systems related to executing the one or more program copies, and of a specified level of performance to be provided by the one or more host computing systems, the specified level of performance including at least one of a minimum degree of reliability in case of a failure that affects a subset of the multiple executing program copies and of a minimum degree of network connectivity performance between the multiple executing program copies, the minimum degree of reliability being based at least in part on the multiple executing program copies being executed on multiple computing systems having at least an indicated lack of proximity, and the minimum degree of network connectivity performance being based at least in part on the multiple executing program copies being executed on one or more computing systems having at least an indicated degree of proximity.

22. The non-transitory computer-readable medium of claim 16 wherein the method further comprises, before the receiving of the indication from the user, defining a group of one or more execution constraints based on instructions received from the user, and wherein the indication from the user of the one or more execution constraints is based on an indication of the defined group.

23. The non-transitory computer-readable medium of claim 16 wherein the computer-readable medium is a memory of the configured computing system.

24. A system, comprising:
one or more processors of one or more computing systems; and
a system manager component having software instructions that, when executed by at least one of the one or more processors, configure at least one of the one or more computing systems to execute program copies for a user by:
receiving an indication from the user of one or more execution constraints for use in selecting one or more host computing systems to execute one or more copies of a program, the one or more execution constraints being based on at least one of locations of the one or more computing systems and of capabilities of the one or more computing systems related to executing the one or more program copies, at least one of the one or more execution constraints being based on one or more indicated degrees of proximity between one or more indicated target computing resources and the one or more host computing systems selected to execute the one or more program copies;
automatically determining one or more candidate host computing systems that are available to execute the one or more program copies in accordance with the one or more execution constraints, the determined candidate host computing systems being selected from a predefined group of multiple distributed computing systems for use in executing programs of users of a program execution service and each having a proximity to at least one of the indicated target computing resources that satisfies at least one of the indicated degrees of proximity;
automatically selecting the one or more host computing systems to execute the one or more program copies from the candidate host computing systems, such that each of the selected one or more host computing systems is to execute at least one of the one or more program copies; and
initiating execution of the one or more program copies on the selected one or more host computing systems.

25. The system of claim 24 wherein the multiple computing systems of the predefined group are inter-connected using multiple data exchange mediums, and wherein a degree of proximity between two computing systems is based at least in part on one or more data exchange mediums that connect the two computing systems.

26. The system of claim 24 wherein the one or more indicated target computing resources are computing systems that at least one of execute one or more indicated programs and of store one or more indicated groups of data.

27. The system of claim 24 wherein the one or more program copies include multiple copies, and wherein the one or more execution constraints indicate one or more geographical locations of the one or more host computing systems with respect to one or more governmental boundaries, one or more capabilities of the one or more computing systems related to executing the one or more program copies, and a specified level of performance to be provided by the one or more host computing systems, the specified level of performance including at least one of a minimum degree of reliability in case of a failure that affects a subset of the multiple executing program copies and of a minimum degree of network connectivity performance between the multiple executing program copies, the minimum degree of reliability being based at least in part on the multiple executing program copies being executed on multiple computing systems having at least an indicated lack of proximity, and the minimum degree of network connectivity performance being based at least in part on the multiple executing program copies being executed on one or more computing systems having at least an indicated degree of proximity.

28. The system of claim 24 further comprising the one or more host computing systems, at least one of the one or more host computing systems each hosting multiple virtual machines that are each able to execute at least one program, and wherein the program is a virtual machine image to be executed by at least one virtual machine hosted by each of the at least one host computing systems.

29. The system of claim 24 wherein the system is part of the program execution service, wherein the program is one of multiple programs associated with the program execution service by customers of the program execution service, the multiple computing systems being used by the program execution service to execute the multiple programs on behalf of the customers, and wherein the system manager component consists of a means for performing the executing of the program copies for the user, and further for executing program copies for multiple other users on selected computing systems in response to received requests from the multiple other users to execute instances of multiple programs.

* * * * *

UNITED STATES PATENT AND TRADEMARK OFFICE
CERTIFICATE OF CORRECTION

| | | |
|---|---|---|
| PATENT NO. | : 7,792,944 B2 | Page 1 of 1 |
| APPLICATION NO. | : 11/851345 | |
| DATED | : September 7, 2010 | |
| INVENTOR(S) | : Peter N. DeSantis et al. | |

It is certified that error appears in the above-identified patent and that said Letters Patent is hereby corrected as shown below:

Column 18
Claim 6, Line 47, "The method of claim 1 wherein the one or more indicated" should read as --The method of claim 2 wherein the one or more indicated--.

Signed and Sealed this
Twenty-second Day of March, 2011

David J. Kappos
*Director of the United States Patent and Trademark Office*